US010426261B2

(12) United States Patent
Theis et al.

(10) Patent No.: US 10,426,261 B2
(45) Date of Patent: Oct. 1, 2019

(54) FLEXIBLE RETENTION SYSTEMS FOR PORTABLE ELECTRONIC DEVICES (71) Applicant: Ergotron, Inc., St. Paul, MN (US)

(72) Inventors: John William Theis, St. Paul, MN (US); Michael John Mullen, West Linn, OR (US); Joshua Jerome Beissel, Bloomington, MN (US); Saeb Salih Asamari, Columbia Heights, MN (US); Thiem Chan Duong Wong, Brooklyn Park, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 15/915,962

(22) Filed: Mar. 8, 2018

(65) Prior Publication Data

US 2018/0255922 A1  Sep. 13, 2018

Related U.S. Application Data (60) Provisional application No. 62/469,138, filed on Mar. 9, 2017.

(51) Int. Cl.
*A47B 21/04* (2006.01)
*A47B 21/02* (2006.01)
(Continued)

(52) U.S. Cl.
CPC .............. *A47B 21/04* (2013.01); *A47B 21/02* (2013.01); *A47B 23/042* (2013.01);
(Continued)

(58) Field of Classification Search
CPC ..... A47B 21/04; A47B 21/045; A47B 23/042; E05B 73/0082
(Continued)

(56) References Cited

U.S. PATENT DOCUMENTS 966,941 A * 8/1910 Murray ................ A47B 21/045
248/442.2
1,071,428 A * 8/1913 Jones .................... A47B 23/042
139/88

(Continued)

FOREIGN PATENT DOCUMENTS

| EP | 2626273 | 8/2013 |
| NL | 2010083 | 7/2014 |
| WO | 2018165447 | 9/2018 |

OTHER PUBLICATIONS

"International Application Serial No. PCT US2018 021578, International Search Report dated Jun. 20, 2018", 6 pgs.

(Continued)

*Primary Examiner* — Jose V Chen
(74) *Attorney, Agent, or Firm* — Schwegman Lundberg & Woessner, P.A.

(57) ABSTRACT

A retention system for securing a portable electronic device to the work surface can include an elongated member. The elongated member can be adapted to couple with a work surface. The retention system can include a device clip. The device clip can be coupled to the elongated member. The device clip can be slidably engaged with the elongated member. The device clip can be adapted to engage with an edge of the portable electronic device located on the work surface.

19 Claims, 8 Drawing Sheets (51) Int. Cl.

| | | |
|---|---|---|
| *F16B 2/22* | (2006.01) | |
| *A47B 23/04* | (2006.01) | |
| *E05B 73/00* | (2006.01) | |
| *F16M 11/04* | (2006.01) | |
| *F16M 11/28* | (2006.01) | |
| *F16M 11/42* | (2006.01) | |
| *F16G 11/02* | (2006.01) | |
| *F16M 13/00* | (2006.01) | |
| *F16G 11/14* | (2006.01) | |

(52) U.S. Cl.
CPC ...... *E05B 73/0005* (2013.01); *E05B 73/0082* (2013.01); *F16B 2/22* (2013.01); *F16G 11/025* (2013.01); *F16G 11/14* (2013.01); *F16M 11/041* (2013.01); *F16M 11/28* (2013.01); *F16M 11/42* (2013.01); *F16M 13/00* (2013.01)

(58) Field of Classification Search
USPC .............. 108/43, 44, 25, 26; 248/451, 447.2
See application file for complete search history.

(56) References Cited

U.S. PATENT DOCUMENTS

| | | | | |
|---|---|---|---|---|
| 3,370,816 | A * | 2/1968 | Michaud | D06F 79/02 248/117.6 |
| 3,903,574 | A | 9/1975 | Fraioli | |
| 4,580,751 | A * | 4/1986 | Panzer | E03C 1/06 248/205.8 |
| 4,702,453 | A * | 10/1987 | Bishop | A47B 23/06 248/447.2 |
| 5,709,365 | A * | 1/1998 | Howard | A47B 23/025 248/447.2 |
| 5,819,456 | A * | 10/1998 | Schwartz | A47B 21/045 40/642.01 |
| 5,836,183 | A | 11/1998 | Derman | |
| 5,881,434 | A * | 3/1999 | Rigney | B43K 23/001 24/11 R |
| 6,216,499 | B1 | 4/2001 | Ronberg et al. | |
| 6,317,938 | B1 | 11/2001 | Durette | |
| 6,443,417 | B2 | 9/2002 | Galant | |
| 6,763,690 | B2 | 7/2004 | Galant | |
| 7,174,752 | B2 | 2/2007 | Galant | |
| 7,324,333 | B2 | 1/2008 | Allen | |
| 7,658,363 | B2 | 2/2010 | Meyer | |
| 7,828,253 | B2 | 11/2010 | Meyer | |
| 7,866,623 | B2 | 1/2011 | Lampman et al. | |
| 8,061,164 | B2 | 11/2011 | Johnston et al. | |
| 8,066,241 | B2 * | 11/2011 | Yu | F16M 11/041 248/286.1 |
| 8,070,123 | B2 | 12/2011 | Yu | |
| 8,413,943 | B1 * | 4/2013 | Li | F16M 11/041 248/292.12 |
| 8,646,294 | B1 | 2/2014 | Derman | |
| 8,649,169 | B2 | 2/2014 | Kwon et al. | |
| 8,711,553 | B2 | 4/2014 | Trinh et al. | |
| 8,882,069 | B2 | 11/2014 | Mahaffey et al. | |
| 9,586,530 | B2 * | 3/2017 | Kim | B60R 11/02 |
| 9,996,710 | B2 * | 6/2018 | Leyden | G06F 21/88 |
| 2002/0134119 | A1 | 9/2002 | Derman | |
| 2003/0034429 | A1 * | 2/2003 | Carnevali | B60R 11/02 248/346.07 |
| 2003/0164010 | A1 * | 9/2003 | Galant | E05B 73/0082 70/58 |
| 2005/0288571 | A1 * | 12/2005 | Perkins | A61B 5/0002 600/407 |
| 2007/0227409 | A1 * | 10/2007 | Chu | A47B 21/00 108/50.02 |
| 2008/0084147 | A1 * | 4/2008 | Brown | A47B 9/08 312/223.3 |
| 2010/0012796 | A1 | 1/2010 | Rossini | |
| 2010/0079285 | A1 * | 4/2010 | Fawcett | E05B 73/0005 340/568.1 |
| 2010/0096517 | A1 | 4/2010 | Lampman et al. | |

OTHER PUBLICATIONS

"International Application Serial No. PCT US2018 021578, Written Opinion dated Jun. 20, 2018", 9 pgs.

* cited by examiner

FLEXIBLE RETENTION SYSTEMS FOR PORTABLE ELECTRONIC DEVICES

CLAIM OF PRIORITY

This patent application claims the benefit of priority of Theis et. al., U.S. Provisional Patent Application Ser. No. 62/469,138, titled "Flexible Retention Systems for Portable Electronic Devices," filed on Mar. 9, 2017, which is hereby incorporated by reference herein in its entirety.

TECHNICAL FIELD

This document pertains generally, but not by way of limitation, to retention systems for portable electronic devices.

BACKGROUND

Work surfaces can be provided for supporting objects, such as a portable electronic device (e.g., laptop, tablet, e-readers, convertible laptops, smartphones, or the like). In some instances, the work surface is able to articulate (e.g., the work surface is repositionable). The articulation of the work surface can cause the objects to fall from the work surface, and the fall can damage the object. In another example, a user may unintentionally interact with the object, and thereby cause the object to fall from the work surface.

SUMMARY

The present inventors have recognized, among other things, that a problem to be solved can include securing portable electronic devices to a work surface. The present subject matter can help provide a solution to this problem, such as by a retention system for securing a portable electronic device to the work surface. The retention system can include an elongated member. The elongated member can be adapted to couple with the work surface. The retention system can include a device clip. The device clip can be coupled to the elongated member. The device clip can be slidably engaged with the elongated member. The device clip can be adapted to engage with an edge of the portable electronic device located on the work surface.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
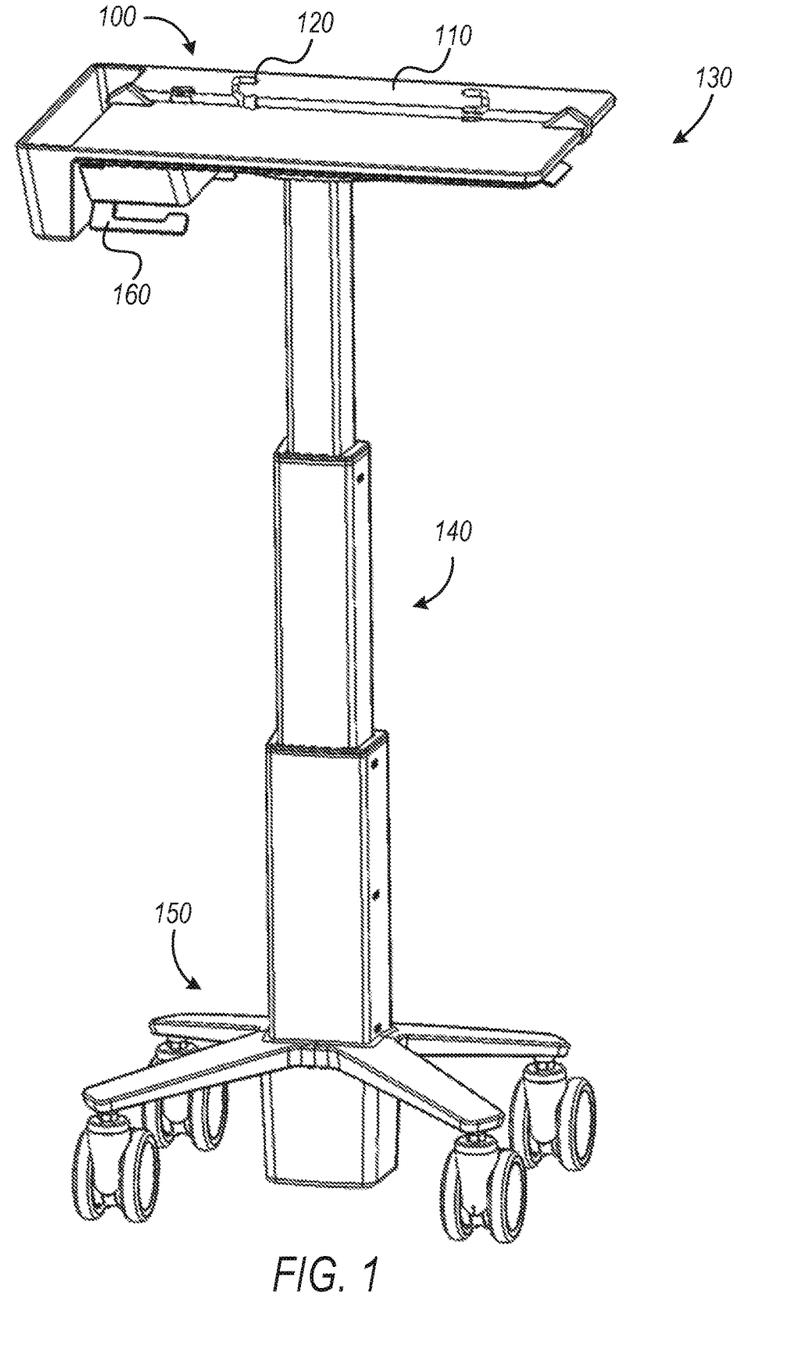
FIG. 1 illustrates a perspective view of one example of a height-adjustable work surface and a retention system.

FIG. 1 illustrates a perspective view of one example of a retention system 100 and a height-adjustable work surface 110. The retention system 100 can include at least one device clip 120. The device clip 120 can be adapted to engage with a portion (e.g., an edge, a hinge, or the like) of a portable electronic device located on the work surface 110.

The work surface 110 can form part of a cart 130. The cart 130 can include a riser 140 and can include a wheeled base 150. The work surface 110 can be coupled to the riser 140. The riser 140 can be coupled to the wheeled base 150. The riser 140 can be adapted to raise and lower the work surface 110 (e.g., with respect to the wheeled base 150). The cart 130 can include a handle 160 adapted to engage and disengage a lock, and thereby allow the work surface 110 to raise and lower. The wheeled base 150 can be adapted (e.g., by coupling wheels to the wheeled base 150) to allow the riser 140 and work surface 110 to translate with respect to a foundation (e.g., a floor or other support surface).

Figure 2:
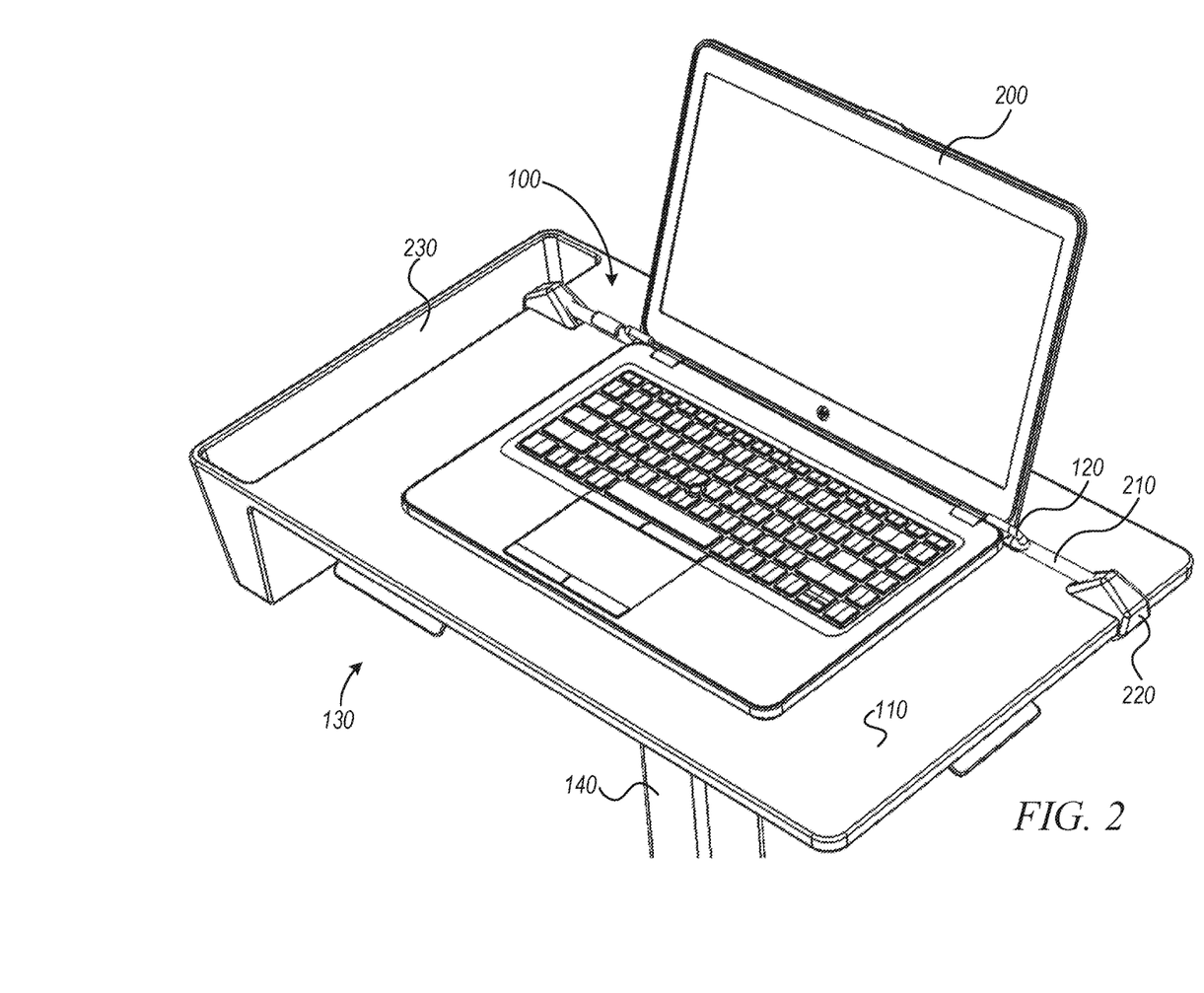
FIG. 2 illustrates a detailed perspective view of the retention system of FIG. 1.

FIG. 2 illustrates a detailed perspective view of the retention system 100 of FIG. 1. As described in this disclosure, the retention system 100 can secure portable electronic devices, such as a device 200, to the work surface 110. In an example, the work surface 110 is able to articulate (e.g., the work surface 110 is repositionable about the riser 140). The articulation of the work surface 110 can cause the device 200 to fall from the work surface 110, and the fall can damage the device 200. In another example, a user may unintentionally interact with (e.g., bump into) the device 200, and thereby cause the device 200 to fall from the work surface 110.

The retention system 100 can help secure the device 200 to the work surface 110. The retention system 100 can include an elongated member 210 and a coupler 220. The coupler 220 can be fixedly attached to the elongated member 210. The elongated member 210 can be adapted to couple with the work surface 110, such as with the coupler 220. The coupler 220 can be sized and shaped to receive, and engage with, a portion of the work surface 110. In an example, the coupler 220 can define a hook sized and shaped to engage with the work surface 110 (e.g., an edge of the work surface 110 can be positioned within the hook), and thereby attach the coupler 220 with the work surface 110. The coupler 220 can be adapted to engage with a pocket or other recess 230 defined in the work surface 110. The coupler 220 can be adapted to receive a fastener, and the fastener can help couple (e.g., secure, affix, or the like) the coupler 220 to the work surface 110. The coupler 220 and the elongated member 210 can be adapted such that a user is able to attach and detach the coupler 220 to and from the elongated member 210 (e.g., by removing the hook from the work surface 110).

The elongated member 210 can span from a first side of the work surface 110 to a second side of the work surface 110. The elongated member 210 can be elastic (e.g., able to withstand a substantial amount of strain, such as doubling a relaxed length of the elongated member 210), and the elongated member 210 can be stretched across the work surface 110. Adapting the elongated member 210 to stretch can allow the retention system 100 to couple with work surfaces of varying dimensions. Adapting the elongated member 210 to stretch can allow the retention system 100 to encircle (e.g., wrap around) the device 200. In an example, the coupler 220 is attached to the work surface 110. The elongated member 210 is stretched across the work surface 110, and another coupler 220 is attached to the work surface 110, thereby coupling the retention system 100 with the work surface 110.

As described in this disclosure, the retention system 100 can include the device clip 120. The device clip 120 can be adapted to couple with the elongated member 210. In an example, a user can couple, and decouple, the device clip 120 from the elongated member 210. The user can engage a portion of the device clip 120 (e.g., the slot 400 of FIG. 4) with a portion of the elongated member 210. The device clip 120 can deflect (e.g., flex) in response to the engagement with the elongated member 210. The deflection of the device clip 120 can allow for the elongated member 210 to be positioned within a cavity (e.g., the cavity 410 of FIG. 4) of the device clip 120, and the device clip 120 can thereby couple with the elongated member 210.

The device clip 120 can be slidably engaged with the elongated member 210. The slidable engagement of the device clip 120 and the elongated member 210 can include that the device clip 120 is adapted to rotate about (e.g., an axis of) the elongated member 210. The slidable engagement of the device clip 120 and the elongated member 210 can include that the device clip 120 is adapted to translate with respect to (e.g., slide along) the elongated member 210. The slidable engagement of the device clip 120 and the elongated member 210 can help the retention system 100 secure portable electronic devices with varying dimensions. The device clip 120 can be biased against the elongated member 210 such that the position of the device clip 120 with respect to the elongated member 210. As described in further detail in this disclosure, the device clip 120 can be adapted to engage with a portion of the device 200 (e.g., an edge, a hinge, or the like).

Figure 3:
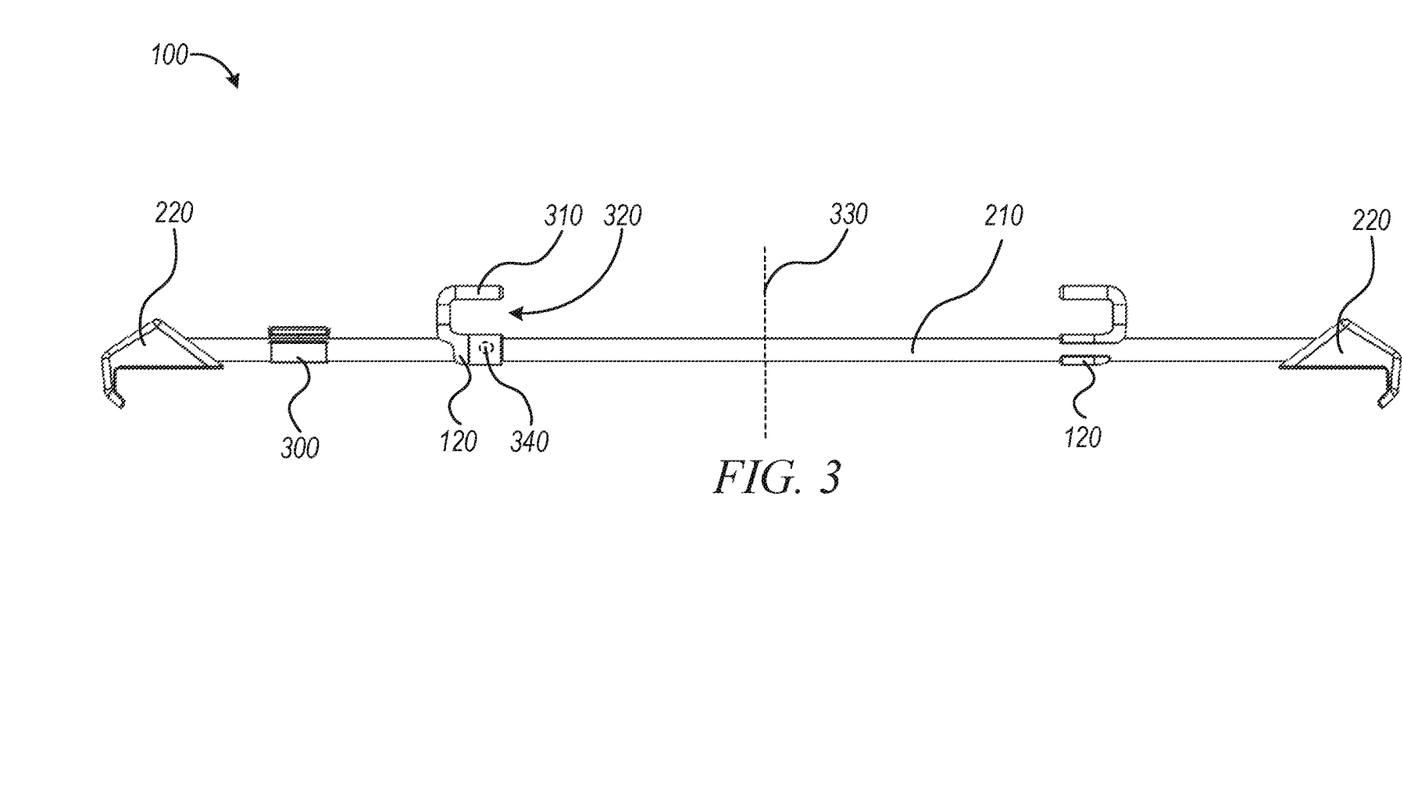
FIG. 3 illustrates a side view of the retention system of FIG. 1.

FIG. 3 illustrates a side view of the retention system of FIG. 1. As described in this disclosure, the retention system 100 can include the elongated member 210, the device clip 120, and the coupler 220. The retention system 100 can include a cable clip 300. The cable clip 300 can be adapted to couple with the elongated member 210. The cable clip 300 can be adapted to slidably engage with the elongated member 210. Additionally, the cable clip 300 can define a slot, and the slot can be sized and shaped such as to receive an electrical cable (e.g., a power supply cable, an audio/video cable, a computer peripheral cable, or the like, or a combination thereof). The slot can extend into a cavity (e.g., the cavity 510 of FIG. 5). The cavity can have dimensions greater than the elongated member 210. Further, the cable clip 300 can be sized and shaped such that the electrical cable can be positioned within a space (e.g., the space 600 of FIG. 6) between the cable clip 300 and the elongated member 210 (e.g., when the cable clip 300 is coupled with the elongated member 210, as shown in FIGS. 3 and 6). The space can be an unoccupied region (e.g., volume) between the elongated member 200 and the cable clip 300. The cable clip 300 can be positioned along the length of the elongated member 210, such as between the coupler 220 and the device clip 120.

Referring again to FIG. 3, the device clip 120 can include an arm 310. The arm 310 can be sized and shaped to engage with a portion of the device 200 (shown in FIG. 2). The arm 310 can define a cavity 320, and the cavity 320 can be adapted to receive a portion of the device 200. The arm 310 can be sized and shaped to engage proximate to a hinge portion of the device 200. In an example, the device 200 can be placed onto the work surface 110 proximate the retention system 100, such as proximate to the elongated member 210. The device clip 120 can be positioned proximate to the device 200, such as by sliding the device clip 120 along the elongated member 120. The device 200 can be positioned between the arm 210 and the elongated member 210, and the device 200 can thereby be secured to the work surface 110.

The retention system 100 can include a plurality of device clips. In an example, the retention system 100 can include a first device clip 120 and a second device clip 120. The first device clip 120 can include a first arm 310, and the second device clip 120 can include a second arm 310. The first device clip 120 and the second device clip 120 can be coupled to the elongated member 210. The first arm 310 can extend toward a center 330 of the retention system 100, and the second arm 310 can extend toward the center 330 of the retention system. Stated another way, the first arm 310 and the second arm 310 can project toward each other. The device 200 (shown in FIG. 2) can be positioned within the cavities (e.g., the cavity 320) defined by both the first arm 310 and the second arm 310. The first arm 310 and the second arm 310 can secure the device 200, and thereby help prevent the device 200 from translating (e.g., moving) with respect to the work surface 110, and can help prevent the device 300 from shifting or falling from the work surface 110.

The retention system 100 can include a securing feature 340. The securing feature 340 can be adapted to help fix the position of the device clip 120 with respect to the elongated member 210. In an example, the retention system 100 can include a threaded fastener. The device clip 120 can define threads adapted to engage with the threaded fastener. The threaded fastener can be engaged with the device clip 120, translate through the device clip 120, and engage with the elongated member 210. The engagement of the securing feature 340 with the elongated member 210 can help fix the position of device clip 120 with respect to the elongated member 210.

Figure 4:
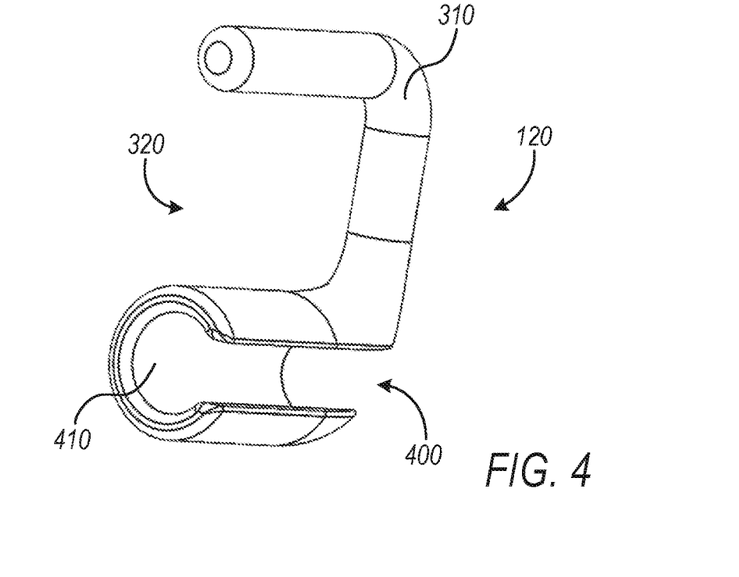
FIG. 4 illustrates a perspective view of one example of a device clip.

FIG. 4 illustrates a perspective view of one example of the device clip 120. As described in this disclosure, the device clip 120 can include the arm 310. The device clip 120 can include a slot 400 defined by the device clip 120. The slot 400 can be sized and shaped to engage with the elongated member 210 (shown in FIGS. 2-3 and 6) such that the device clip 120 can selectively couple (e.g., attach and detach) with the elongated member 210.

The slot 400 can extend into a cavity 410 defined by the device clip 120. The cavity 410 can be sized and shaped to receive the elongated member 210. In an example, a user can engage the slot 400 with the elongated member 210. The device clip 410 can be adapted to flex such that a dimension of the slot 400 increases, and the elongated member 210 can be positioned within the cavity 410 in the device clip 120. Similarly, the elongated member 210 (shown in FIGS. 2-3 and 6) can be flexible. A user can engage the slot 400 with the elongated member 210, and the elongated member 210 can deform such that the elongated member 210 can be positioned within the cavity 410. The positioning of the elongated member 210 within the cavity 410 can bias the device clip 120 against the elongated member 210 such that the position of the device clip 120 with respect to the elongated member 210 is maintained (e.g., the device clip 120 is not loosely engaged with the elongated member 210). Stated another way, an interference fit can exist when the device clip 120 is coupled with the elongated member 210.

Figure 5:
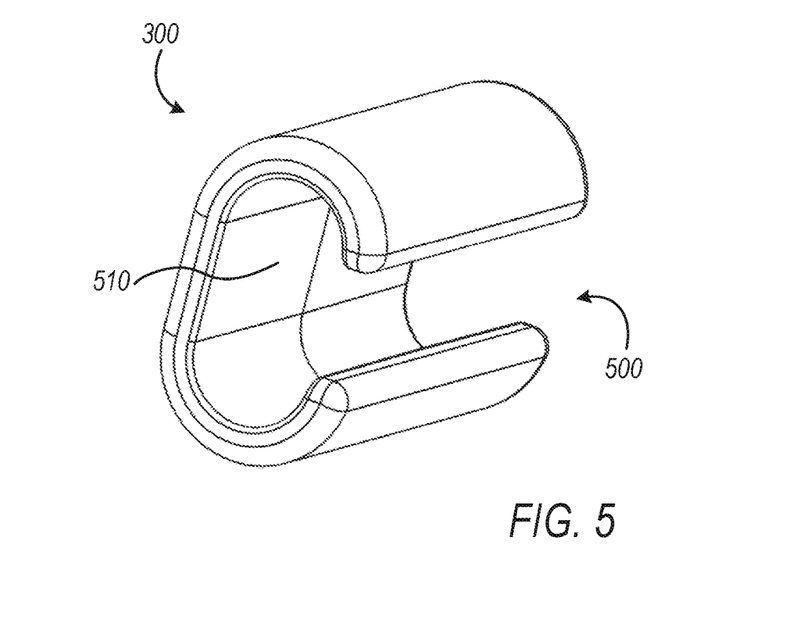
FIG. 5 illustrates a perspective view of one example of a cable clip.
Figure 6:
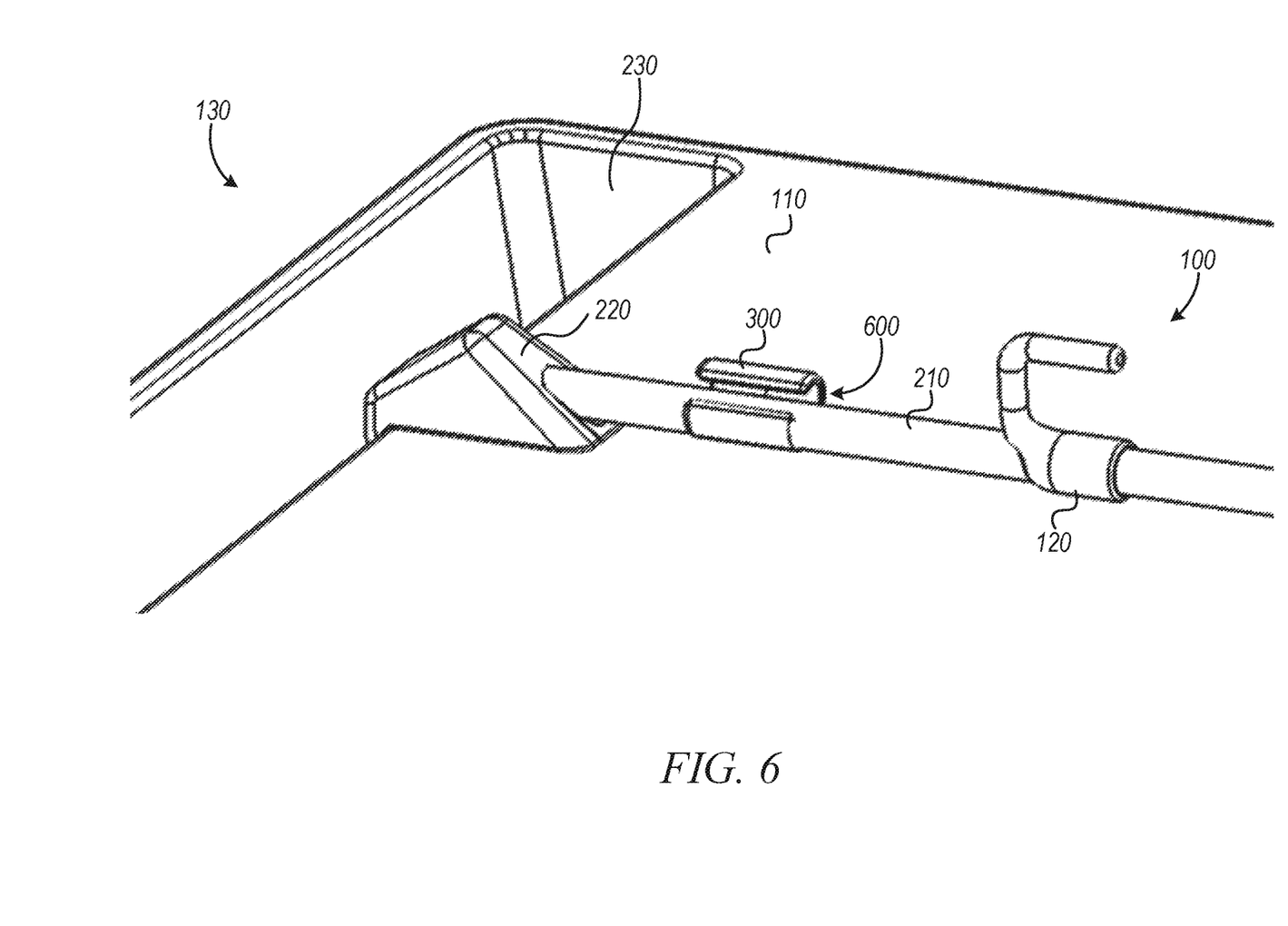
FIG. 6 illustrates another perspective view of the retention system of FIG. 1.

FIG. 5 illustrates a perspective view of one example of a cable clip 300. As described in this disclosure, the cable clip 300 can be adapted to couple with the elongated member 210 (shown in FIGS. 2-3 and 6). Additionally, the cable clip 300 can be adapted to slidably engage with the elongated member 210.

The cable clip 300 (e.g., a C-shaped clip), can define a slot 500 that can extend into a cavity 510. The slot 500 can have a dimension (e.g., a width), greater than a dimension of the elongated member 210 (e.g., diameter of an elastic band), to allow the cable clip 300 to be fitted over the elongated member 210. The elongated member 210 can be positioned within the cavity 510. A portion of the cable clip 300 can engage with the elongated member 210, and thereby couple the cable clip 300 with the elongated member. The cable clip 300 can be biased against the elongated member 210 such that a position of the cable clip 300 with respect to the elongated member 210 is maintained.

FIG. 6 illustrates another perspective view of the retention system of FIG. 1. The cable clip 300 can be sized and shaped such that an electrical cable can be positioned within a space 600 between the cable clip 300 and the elongated member 210. The cable clip 300 can retain one or more electrical cables. The space 600 can be the remaining volume of the cavity 510 (shown in FIG. 5) that is not occupied by the elongated member 210. Stated another way, the cavity 510 can be oversized with respect to the elongated member 210 such that the space 600 is formed when the cable clip 300 is coupled with the elongated member 210. The cable clip 300 can maintain the position of (e.g., retain) the electrical cable when the electrical cable is positioned within the space 600. The cable clip 300 can be positioned between the coupler 220 and the device clip 120.

As described in this disclosure, the coupler 220 can be adapted to couple with the pocket 230 defined by the work surface 110. In an example, the coupler 220 can engage with a lip defined in the pocket 230. In another example, the pocket 230 can define an opening in a wall of the pocket 230, and the opening can expose an edge of the work surface 110, such as to allow the coupler 220 to engage with the edge of the work surface 110.

Figure 7:
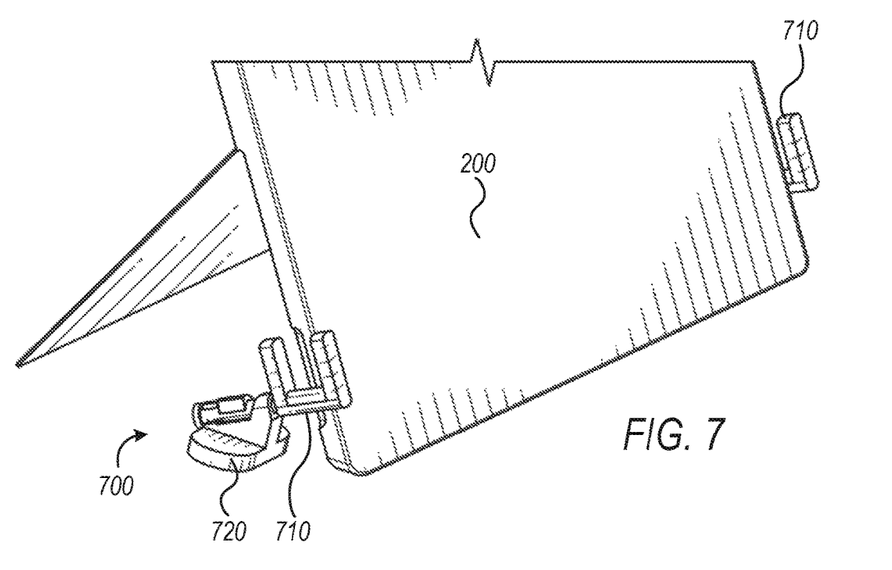
FIG. 7 illustrates a perspective view of one example of a retention system.

FIG. 7 illustrates a perspective view of one example of a retention system 700. The retention system 700 can include a fork 710 attached to a base 720. Shown in an unsecured (or upright) position, the fork 710 can rotate downward and can secure a portion of a device 730 between jaws 800 and 810 (shown in FIG. 8).

Figure 8:
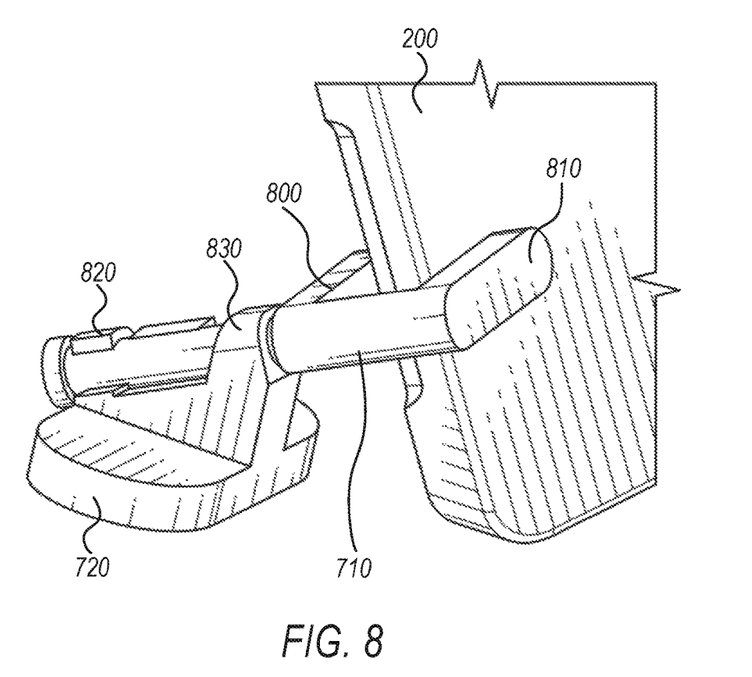
FIG. 8 illustrates a perspective view of the retention system of FIG. 7.

FIG. 8 illustrates a perspective view of the retention system of FIG. 7. The jaws 800 and 810 can be fixed apart at a first distance. The jaws 800 and 810 can be adapted such that the jaw 810 is biased toward (or biased away from) the jaw 800. The fork 710 can be biased toward the base 720.

The fork 710 can be adapted to snap into one or more clips 820 and 830 defined by the base 720. Openings for the clips 820 and 830 can be defined on opposite sides of the base 720, thereby helping to improve the resiliency of the retention system 700 (e.g., by helping prevent the fork 710 from decoupling from the base 720). In some examples, the fork 710 can rotate greater than 90 degrees, (e.g., 180 degrees), such as to allow the same fork 710 design to be used on both sides of the device 200 (e.g., the display of the device 200) without having to have different assembly designs specific to left and right orientations. In some examples, the base 720 can be removably affixed to a work surface 110 (e.g., using suction cups, a removable adhesive, hook and loop fasteners, or the like).

Figure 9:
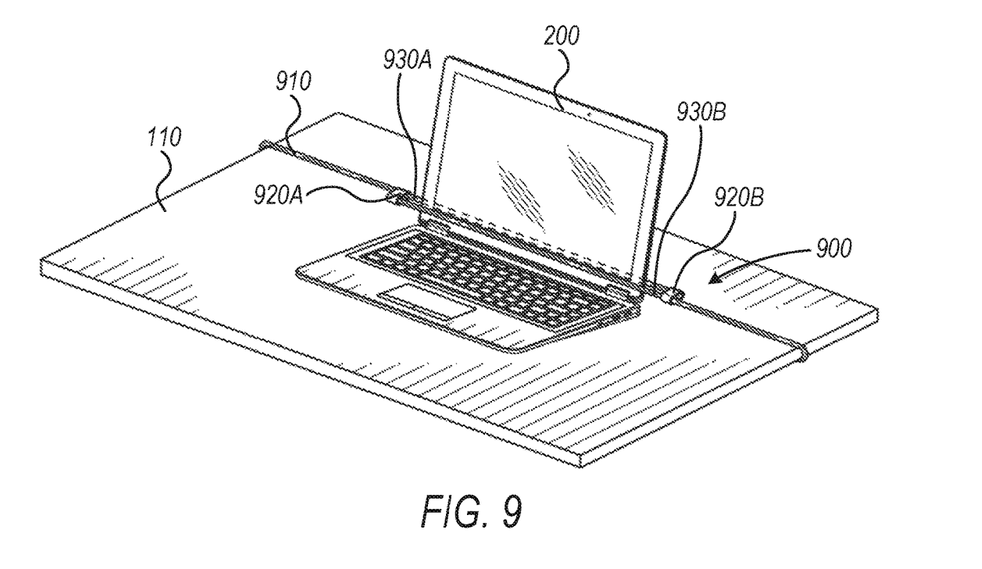
FIG. 9 illustrates a perspective view of one example of a retention system.

FIG. 9 illustrates a perspective view of one example of a retention system 900. The retention system 900 can include a retention band 910 and two clips 920A and 920B. The retention band 910 can be elastic. The two clips 920A and 920B can be fixedly attached to ends of the band 910. The band 910 can extend underneath the work surface 110, wrap around a top of the work surface 110, and the clips 920A and 920B can attach the ends of the band 910 to intermediate portions of the band 910. The band 910 can include a first hand portion 930A and a second band portion 930B. The first band portion 930A can be positioned on a first side (e.g., rear) of the device 200, and the second band portion 930B can be positioned on a second side (e.g., front) of the device 200.

As seen in FIG. 9, the band 910 can include a first band portion 950 and a second band portion 960. The first band portion 950 and the second band portion 960 can extend around both the front and back of the portable electronic device 200 (e.g., a display of the device 200) to secure the device 200 to the work surface 110.

Figure 10:
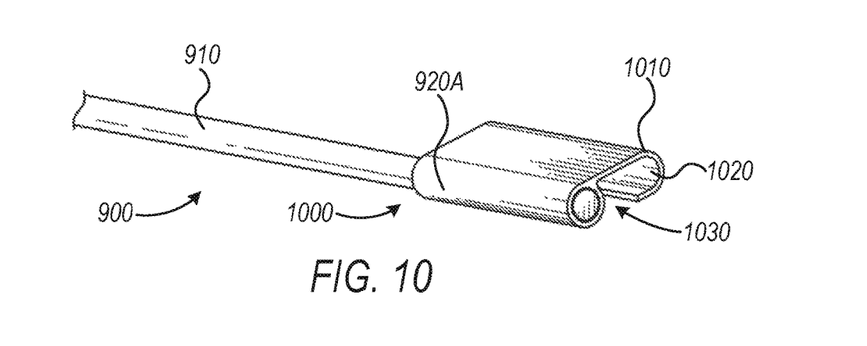
FIG. 10 illustrates a perspective view of a portion of the retention system of FIG. 9.

FIG. 10 illustrates a perspective view of a portion of the retention system 900 of FIG. 9. As seen in FIG. 10, the clip 920A can be securely affixed to an end portion 1000 of the band 910. The clip 920A can include a curved portion 1010 defining a region 1020 adapted to attach to a portion of the band 910, as seen in FIG. 9. The region 1020 can be sized and shaped to receive the band 910. The curved portion 1010 can define a slot 1030 extending into the region 1020. The slot 1030 can be adapted to allow the band 910 to translate into the region 1020.

Figure 11:
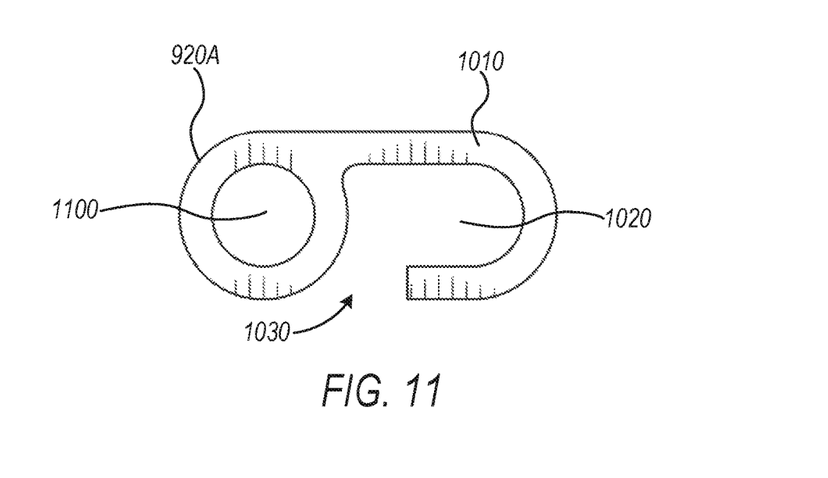
FIG. 11 illustrates a cross-sectional view of another portion of the retention system of FIG. 9.

FIG. 11 illustrates a cross-sectional view of another portion of the retention system 900 of FIG. 9. The clip 920A can define a band region 1100 adapted to receive, and couple with, the end portion 1000 (shown in FIG. 10) of the band 910. The clip 910 can define the curved portion 1010, and the curved portion 1010 can be adapted to attach to a portion of the band 910, as seen in FIG. 9. The retention system 900 can include the device clip 120 (shown in FIGS. 1-4, and 6) and can include the cable clip 300 (shown in FIGS. 3, and 5-6). The device clip 120 and the cable clip 300 can couple with the band 910.

Figure 12:
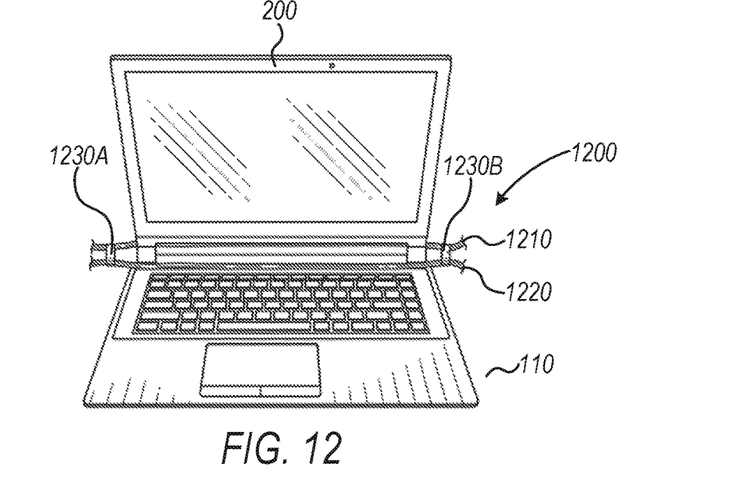
FIG. 12 illustrates a perspective view of one example of a retention system.

FIG. 12 illustrates a perspective view of one example of a retention system 1200. The retention system 1200 can include at least two retention bands 1210 and 1220. The bands 1210 and 1220 can extend across the work surface 110. The bands 1210 and 1220 can be elastic. The bands 1210 and 1220 can extend in front of, and behind, the portable electronic device 200, and thereby help secure the device 200 between the bands 1210 and 1220. The retention system 1200 can include any combination of multiple bands, multiple locations, and/or multiple devices on a single horizontal surface.

The retention system 1200 can include coupler clips 1230A and 1230B that can be adapted to couple the bands 1210 and 1220 together. The clips 1230 can help secure the device 200 between the bands 1210 and 1220. The clips 1230 can be used in any orientation and can slide along the bands 1210 and 1220 until the clips are adjacent to (or form a direct interface with) one or both sides of the device 200.

Figure 13:
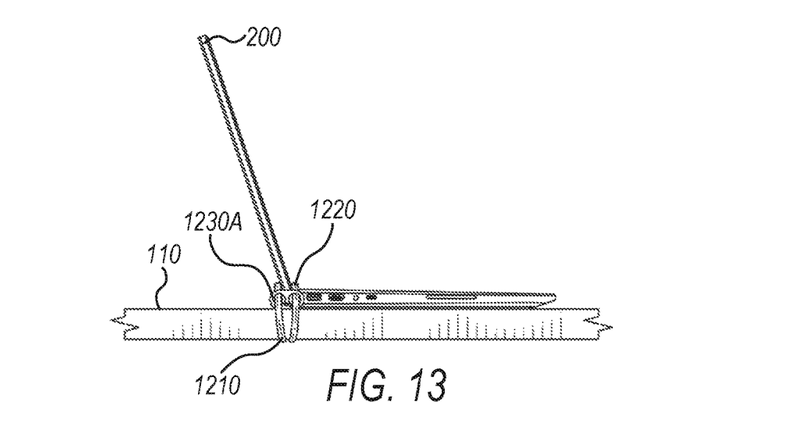
FIG. 13 illustrates a side view of a portion of the retention system of FIG. 12.

FIG. 13 illustrates a side view of a portion of the retention system 1200 of FIG. 12. As seen in FIG. 13, the bands 1210 and 1220 can be positioned on a front and rear side of the device 200. The bands 1210 and 1220 can be coupled to, and wrap around, the work surface 110. The retention system 1200 can include the device clip 120 (shown in FIGS. 1-4, and 6) and can include the cable clip 300 (shown in FIGS. 3, and 5-6). The device clip 120 and the cable clip 300 can couple with the bands 1210 and 1220.

Figure 14:
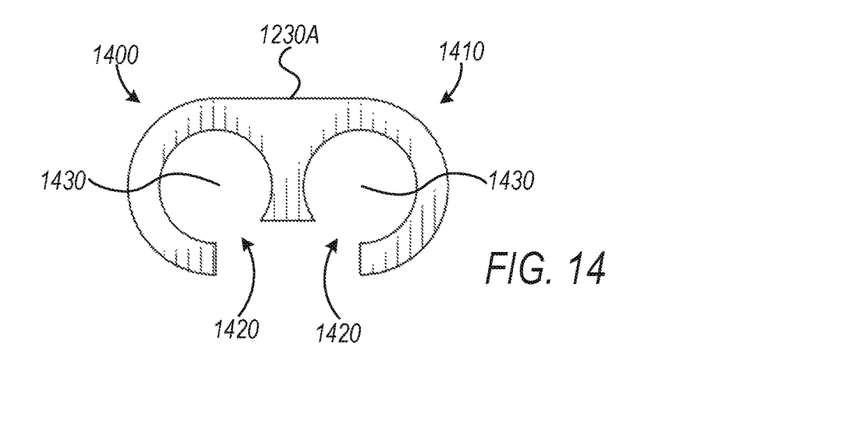
FIG. 14 illustrates a cross-sectional view of another portion of the retention system of FIG. 12.

FIG. 14 illustrates a cross-sectional view of another portion of the retention system 1200 of FIG. 12. The coupler clip 1230 can define two regions 1400 and 1410 that can receive portions of the retention bands 1210 and 1220. The two regions 1400 and 1410 can each define a slot 1420 extending into a cavity 1430. The slot 1420 can be adapted to allow the band 1210 to translate into the cavity 1430. The coupler clip 1230 can retain the band 1210 (and the band 1220) within the cavity 1430.

VARIOUS NOTES & EXAMPLES

Aspect 1 can include or use subject matter (such as an apparatus, a system, a device, a method, a means for performing acts, or a device readable medium including instructions that, when performed by the device, can cause the device to perform acts, or an article of manufacture), such as can include or use a retention system for securing a portable electronic device on a work surface. The retention system can include an elongated member. The elongated member can be adapted to couple with the work surface. The retention system can include a device clip. The device clip can be coupled to the elongated member. The device clip can be slidably engaged with the elongated member. The device clip can be adapted to engage with an edge of the portable electronic device located on the work surface.

Aspect 2 can include or use, or can optionally be combined with the subject matter of Aspect 1, to optionally include or use that the slidable engagement of the device clip and the elongated member can include that the device clip can be adapted to rotate about, and can be adapted to translate with respect to, the elongated member.

Aspect 3 can include or use, or can optionally be combined with the subject matter of one or any combination of Aspects 1 or 2 to optionally include or use that the device clip includes an arm.

Aspect 4 can include or use, or can optionally be combined with the subject matter of Aspect 3 to optionally include or use that the arm can be sized and shaped to engage proximate to a hinge portion of the portable electronic device.

Aspect 5 can include or use, or can optionally be combined with the subject matter of one or any combination of Aspects 1 through 4 to optionally include or use that device clip is a first device clip and can include a first arm. The retention system can include a second device clip that can include a second arm. The first arm can extend toward a center of the retention system and the second arm can extend toward the center of the retention system.

Aspect 6 can include or use, or can optionally be combined with the subject matter of one or any combination of Aspects 1 through 5 to optionally include or use a cable clip. The cable clip can be coupled with the elongated member. The cable clip can be adapted to slidably engage with the elongated member. The cable clip can define a slot sized and shaped such to receive an electrical cable. The cable clip can be sized and shaped such that the electrical cable can be positioned within a space between the cable clip and the elongated member.

Aspect 7 can include or use, or can optionally be combined with the subject matter of one or any combination of Aspects 1 through 6 to optionally include or use the work surface. The retention system can include a riser coupled to the work surface. The riser can be adapted to raise and lower the work surface. The retention system can include a wheeled base coupled to the riser. The wheeled base can be adapted to allow the riser and work surface to translate with respect to a foundation.

Aspect 8 can include or use, or can optionally be combined with the subject matter of one or any combination of Aspects 1 through 7 to optionally include or use a pocket defined in the work surface. A portion of the retention system can be engaged with the pocket.

Aspect 9 can include or use, or can optionally be combined with the subject matter of Aspect 8 to optionally include or use that a cable clip can be positioned between the pocket and the device clip.

Aspect 10 can include or use, or can optionally be combined with the subject matter of one or any combination of Aspects 1 through 9 to optionally include or use that the device clip can define a slot. The slot can be sized and shaped to engage with the elongated member such that the device clip can selectively couple with the elongated member.

Aspect 11 can include or use, or can optionally be combined with the subject matter of one or any combination of Aspects 1 through 10 to optionally include or use that the device clip can be biased against the elongated member such that the device clip can maintain its position with respect to the elongated member.

Aspect 12 can include or use, or can optionally be combined with the subject matter of one or any combination of Aspects 1 through 3 to optionally include or use a securing feature. The securing feature can be adapted to fix the position of the device clip, such as with respect to the elongated member.

Aspect 13 can include or use, or can optionally be combined with the subject matter of one or any combination of Aspects 1 through 3 to optionally include or use a coupler. The coupler can be fixedly attached to the elongated member. The coupler can be sized and shaped to engage with a portion of the work surface.

Aspect 14 can include or use subject matter (such as an apparatus, a system, a device, a method, a means for performing acts, or a device readable medium including instructions that, when performed by the device, can cause the device to perform acts, or an article of manufacture), such as can include or use a retention system for securing a portable electronic device on a work surface. The retention system can include at least one fixed member. The fixed member can be coupled to the work surface. The retention system can include at least one fork member. The fork member can be rotatingly coupled to the fixed member. The at least one fork member can be configured to rotate and can retain an edge of the portable electronic device located on the work surface.

Aspect 15 can include or use, or can optionally be combined with the subject matter of Aspect 14, to optionally include or use a biasing element. The biasing element can be adapted to bias the fork member toward the fixed member.

Aspect 16 can include or use, or can optionally be combined with the subject matter of one or any combination of Aspects 14 or 15 to optionally include or use that the fork member can be adapted to rotate greater than 90 degrees with respect to the fixed member.

Aspect 17 can include or use, or can optionally be combined with the subject matter of one or any combination of Aspects 14 through 16 to optionally include or use that the fixed member can define a first clip having a first opening. The fixed base can define a second clip having a second opening. The first opening can be defined on a first side of the fixed member and the second opening is defined on a second side of the fixed member.

Aspect 18 can include or use, or can optionally be combined with the subject matter of one or any combination of Aspects 14 through 17 to optionally include or use that the fixed member can be adapted to be removably affixed to the work surface.

Aspect 19 can include or use subject matter (such as an apparatus, a system, a device, a method, a means for performing acts, or a device readable medium including instructions that, when performed by the device, can cause the device to perform acts, or an article of manufacture), such as can include or use a retention system for securing a portable electronic device on a work surface. The retention system can include a flexible elongated member. The flexible elongated member can be coupled to the work surface. The retention system can include a first hook. The first hook can be fixedly attached to the elongated member, such as with a first end region of the elongated member. The retention system can include a second hook. The second hook can be fixedly attached to the elongated member, such as with a second end region of the elongated member. The first and second end regions of the elongated member can overlap. The first hook and the second hook can couple to a portion of the elongated member. The retention system can encircle a portion of the portable electronic device.

Aspect 20 can include or use, or can optionally be combined with the subject matter of Aspect 19, to optionally include or use that the flexible elongated member can form a direct interface with a top surface of the work surface and a bottom surface of the work surface.

Aspect 21 can include or use subject matter (such as an apparatus, a system, a device, a method, a means for performing acts, or a device readable medium including instructions that, when performed by the device, can cause the device to perform acts, or an article of manufacture), such as can include or use a retention system for securing a portable electronic device on a work surface. The retention system can include a first elongated member. The first elongated member can be coupled to the work surface. The retention system can include a second elongated member. The second elongated member can be coupled to the work surface.

The retention system can include a first coupler clip. The first coupler clip can be engaged to the first elongated member. The first coupler clip can be engaged to the second elongating member. The first coupler clip can be slidable along the first elongated member and second elongating member. The first coupler clip is configured to be positioned adjacent to a portion of the portable electronic device to retain the portable electronic device between the first elongated member and the second elongated member.

Aspect 22 can include or use, or can optionally be combined with the subject matter of Aspect 21, to optionally include or use a second coupler clip. The second coupler clip can be engaged to the first elongated member. The second coupler clip can be engaged to the second elongated member. The first coupler clip can be adapted to be positioned adjacent a first side of the portable electronic device. The second coupler clip can be adapted to be positioned adjacent a second side of the portable electronic device.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A retention system for securing a portable electronic device on a work surface, the system comprising:
    an elongated member adapted to couple with the work surface;
    a device clip configured to couple with the elongated member wherein the device clip is configured to slidably engage with the elongated member, and wherein the device clip is adapted to engage with an edge of the portable electronic device located on the work surface by receiving the edge of the portable electronic device within a device cavity defined by the device clip; and
    a cable clip configured to couple with the elongated member, wherein:
        the cable clip is adapted to slidably engage with the elongated member, and
        the cable clip defines a slot that extends into a cable cavity, wherein:
            the cable cavity is sized and shaped to receive the elongated member,
            the cable cavity has a greater dimension than the elongated member, and
            when the elongated member is received in the cable cavity, the cable clip and the elongated member define a cable space sized and shaped to receive an electrical cable between the elongated member and the cable clip.

2. The retention system of claim 1, wherein the device clip is adapted to rotate about, and translate with respect to, the elongated member.

3. The retention system of claim 1, wherein the device clip includes an arm.

4. The retention system claim 1, wherein device clip is a first device clip with a first arm, and further comprising:
    a second device clip with a second arm, and
    wherein the first arm extends toward a center of the retention system and the second arm extends toward the center of the retention system.

5. The retention system of claim 1, further comprising the portable electronic device.

6. The retention system of claim 1, further comprising:
    the work surface;
    a riser coupled to the work surface, wherein the riser is adapted to raise and lower the work surface; and
    a wheeled base coupled to the riser, wherein the wheeled base is adapted to allow the riser and work surface to translate with respect to a foundation.

7. The retention system of claim 6, further comprising a pocket defined in the work surface, and wherein a portion of the retention system is engaged with the pocket.

8. The retention system of claim 7, wherein the cable clip is positioned between the pocket and the device clip.

9. The retention system of claim 1, wherein the device clip defines a slot, and the slot is sized and shaped to engage with the elongated member such that the device clip can selectively couple with the elongated member.

10. The retentions system of claim 1, wherein the device clip is biased against the elongated member such that the device clip maintains its position with respect to the elongated member.

11. The retention system of claim 1, further comprising a securing feature adapted to fix a position of the device clip with respect to the elongated member.

12. The retention system of claim 1, further comprising a coupler fixedly attached to the elongated member, wherein the coupler is sized and shaped to engage with a portion of the work surface.

13. A retention system for securing a portable electronic device on a work surface, the system comprising:
    at least one fixed member coupled to the work surface and defining a first clip having a first opening and a second clip having a second opening, and wherein the first opening is defined on a first side of the fixed member and the second opening is defined on a second side of the fixed member; and
    at least one fork member rotatingly coupled with the first clip and second clip of the fixed member,
    wherein the at least one fork member is configured to rotate with respect to the fixed member and the fork is configured to engage with a portion of the portable electronic device located on the work surface to secure the portable electronic device on the work surface.

14. The retention system of claim 13, further comprising a biasing element adapted to bias the fork member toward the fixed member.

15. The retention system of claim 13, wherein the fork member is adapted to rotate greater than 90 degrees with respect to the fixed member.

16. The retention system of claim 13, further comprising the electronic device.

17. The retention system of claim 13, wherein the fixed member is adapted to be removably affixed to the work surface.

18. A retention system for securing a portable electronic device on a work surface, the system comprising:
    a flexible elongated member coupled to the work surface having a first end region, a second end region, and an intermediate region located between the first end region and the second end region;
    a first hook fixedly attached to a first end region of the elongated member and defining a first reception region sized and shaped to receive the elongated member, wherein reception of the elongated member within the first reception region attaches the first hook to the elongated member; and a second hook fixedly attached to a second end region of the elongated member and defining a first reception region sized and shaped to receive the elongated member, wherein reception of the elongated member within the first reception region attaches the hook to the elongated member, wherein the first and second end regions of the elongated member overlap and the first hook and the second hook couple to the intermediate region of the elongated member, thereby encircling a portion of the portable electronic device.

19. The retention system of claim 18, wherein the flexible elongated member is configured to form a direct interface with a top surface of the work surface and a bottom surface of the work surface.

* * * * *

UNITED STATES PATENT AND TRADEMARK OFFICE
CERTIFICATE OF CORRECTION

PATENT NO. : 10,426,261 B2
APPLICATION NO. : 15/915962
DATED : October 1, 2019
INVENTOR(S) : Theis et al.

Page 1 of 1

It is certified that error appears in the above-identified patent and that said Letters Patent is hereby corrected as shown below:

In the Specification

In Column 4, Line 9, delete "200" and insert --210-- therefor

In Column 4, Line 24, delete "120." and insert --210.-- therefor

In Column 4, Line 25, delete "210" and insert --310-- therefor

In Column 4, Line 44, delete "300" and insert --200-- therefor

In Column 5, Line 3, delete "410" and insert --120-- therefor

In Column 6, Line 27, delete "hand" and insert --band-- therefor

In the Claims

In Column 11, Line 66, in Claim 4, before "claim", insert --of--

Signed and Sealed this
Twelfth Day of January, 2021

Andrei Iancu
*Director of the United States Patent and Trademark Office*